March 7, 1961 J. W. LOTER ET AL 2,973,943
FENCE BLIND
Filed Oct. 18, 1957 2 Sheets-Sheet 1

INVENTORS
J. W. LOTER,
ULIS S. ROBERTS,
BY
William G. Konold

March 7, 1961  J. W. LOTER ET AL  2,973,943
FENCE BLIND
Filed Oct. 18, 1957  2 Sheets-Sheet 2

INVENTORS
J. W. LOTER,
ULIS S. ROBERTS,
BY
William D. Konold

United States Patent Office 2,973,943
Patented Mar. 7, 1961

2,973,943

FENCE BLIND

James W. Loter, 423 Hughes Drive, Irving, Tex., and Ulus S. Roberts, 9037 Dorinda Circle, Dallas, Tex.

Filed Oct. 18, 1957, Ser. No. 691,049

1 Claim. (Cl. 256—21)

This invention relates to a fence blind and more particularly to a louvered fence construction having an arrangement for conveniently varying the angle of inclination of the louvers.

The apparatus of the present invention has particular application in those suburban developments having small lots with homes placed rather close together. In the interest of having some semblance of privacy for back yard activity, many home owners construct fences along property lines.

The disadvantage of such fences is principally in the fact that the fence will permanently exclude some sunlight and breezes if it is closed completely enough to provide substantially complete privacy. On the other hand, if the fence is open enough to permit sun-light and breezes, privacy must be sacrificed.

It is the object of the present invention to combine in one fence the desirable features of either the open or closed type fence by providing louvers which are adjustable to a closed position or a substantially open position.

It is another object of the invention to provide a fence of the type described which is prefabricated in sections which are easy to assemble and which permit fences of varying sizes to be constructed at a minimum cost to the purchaser.

These and other objects of the invention will become more readily apparent from the following detailed description of the invention taken in conjunction with the accompanying drawings, in which.

Figure 1:
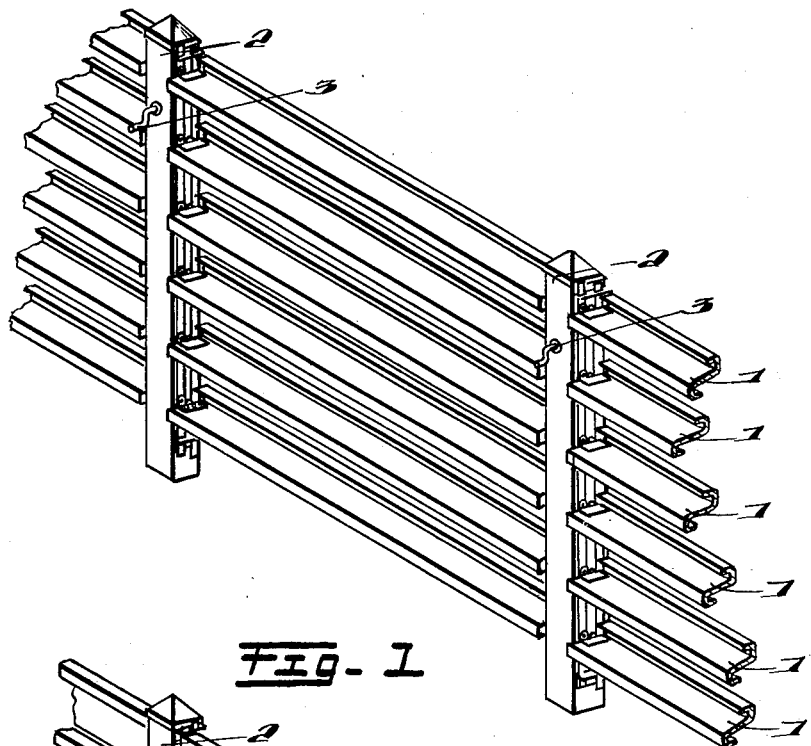
Fig. 1 is a perspective view of the invention.
Figure 2:
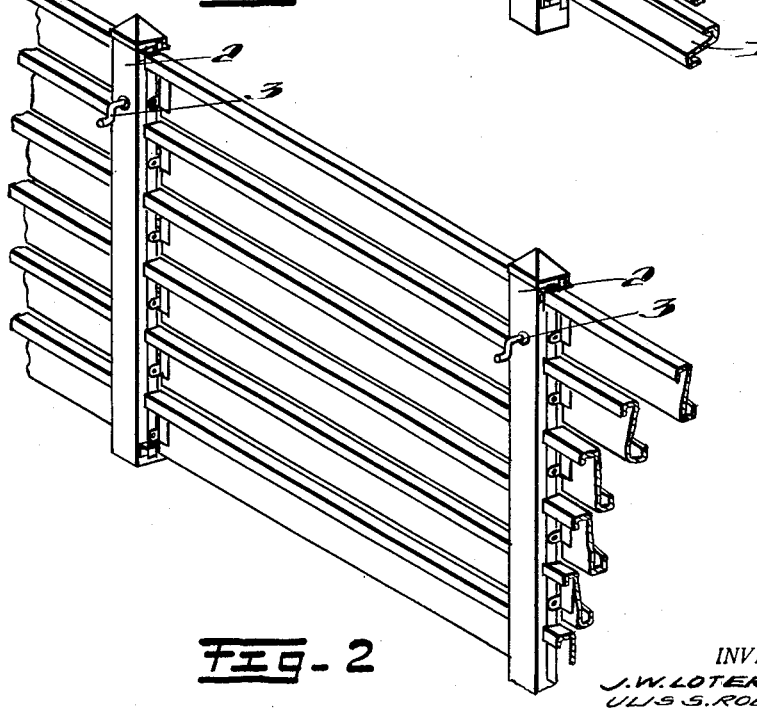
Fig. 2 is a perspective view of the invention showing the louver slats in the different positions.

The fence consists of a plurality of sections, each section consisting of a post 2, a plurality of vertically spaced horizontally extending slats 1, and means for altering the angle of inclination of the slats through the turning of a crank 3. As viewed in Fig. 1, the slats are in open position and in Fig. 2, the slats have been rotated 90° to closed position in which complete privacy is afforded.

Figure 3:
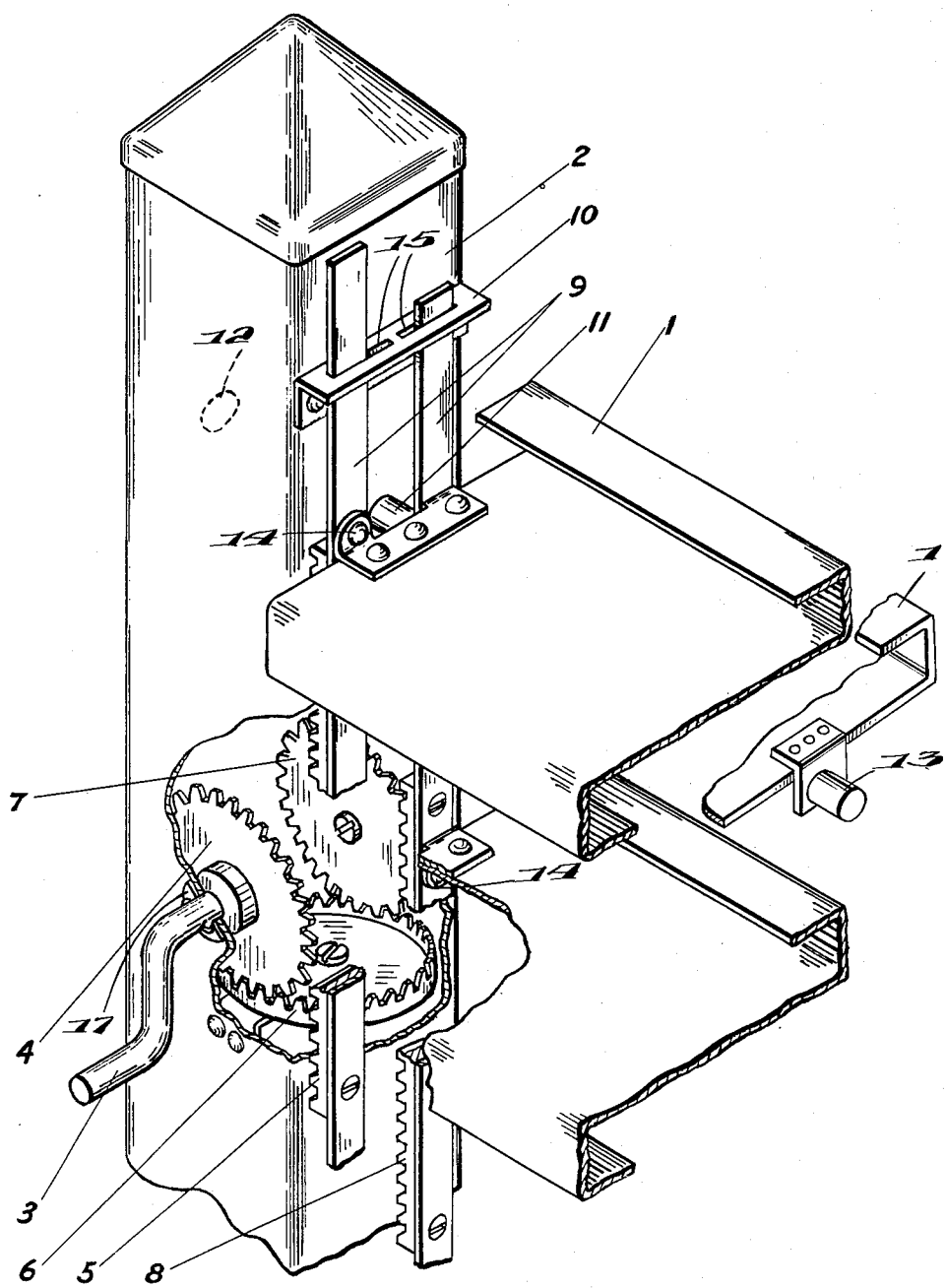
Fig. 3 is a fragmentary perspective view of the invention showing the operating mechanism.

The operating mechanism and the manner of construction of the fence sections is shown in Fig. 3.

The louver slats are pivotally mounted by a pin 11 to the fence post 2. The other end of the slat is provided with a pivot pin for engagement with a hole in an adjoining fence post. Such a hole is indicated in dotted lines at 12 on fence post 2 and the pin indicated at 13 in the fragment is shown in Fig. 3.

On either side of the pivot pins 11, the slats are pivoted at 14 to bars 9 which are slidably mounted in elongated slots 15 in brackets 10 fixed to the fence post 2.

Fixed to the bars 9 are racks 5 and 8. Rack 5 cooperates with a pinion 4 which is driven by the crank 3 journaled at 17 in the wall of the fence post 2. The rack 8 cooperates with the pinion 7 rotatably mounted in the fence post 2. An interconnecting gear 6 transmits the motion of gear 4 to gear 7 so that upon rotating crank 3, the pinions 4 and 7 rotate in opposite directions. Because of the engagement of pinions 4 and 7 with racks 5 and 8, the racks 5 and 8 move in opposite directions upon rotation of the crank 3. By way of example, clockwise rotation of crank 3 drives rack 5 downwardly and racks 8 upwardly. The motion of the racks is transmitted through the bars 9 and pins 14 to the louver slats 1, whereby the louver slats are rotated to a vertical position.

The sections described above are very easily assembled into a complete fence. It is necessary to obtain the required number of sections plus one fence post to receive the slats of the last section. At corners, either an additional fence post having appropriate holes for journaling the pins 13 can be provided, or the regular fence post 2 can be provided with journaling means for reception of pins 13.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

What is claimed is:

An aluminum fence blind constructed from a plurality of sections each comprising a hollow fence post having a plurality of vertically spaced holes on one side of said post, a plurality of vertically spaced slats each pivotally mounted at one end thereof to the opposite side of said post from said holes, said slats each having a pivot pin at the other ends thereof to be received in holes of the post of an adjoining section, at least one vertically extending bar pivotally connected to one end of each said slat at a point spaced from said pivotal mounting, rack teeth on said bar, a pinion rotatably mounted in said post and engaging said rack teeth, and a crank connected to said pinion for driving said pinion to raise and lower said rack bar thereby pivoting said slats.

References Cited in the file of this patent

UNITED STATES PATENTS

| | | |
|---|---|---|
| 1,070,616 | Lafquist et al. | Aug. 19, 1913 |
| 1,749,068 | De Land | Mar. 4, 1930 |
| 2,208,881 | De Land | July 23, 1940 |
| 2,568,215 | Brown | Sept. 18, 1951 |